US012778156B2

(12) United States Patent
Fujiharu

(10) Patent No.: US 12,778,156 B2
(45) Date of Patent: Nov. 3, 2026

(54) METHOD FOR MANUFACTURING BUTTER-LIKE FOOD DERIVED FROM VEGETABLE MILK AND BUTTER-LIKE FOOD DERIVED FROM VEGETABLE MILK

(71) Applicant: WISTERIA CO., LTD., Tokyo (JP)

(72) Inventor: Koji Fujiharu, Tokyo (JP)

(73) Assignee: WISTERIA CO., LTD., Tokyo (JP)

( * ) Notice: Subject to any disclaimer, the term of this patent is extended or adjusted under 35 U.S.C. 154(b) by 1265 days.

(21) Appl. No.: 17/420,772

(22) PCT Filed: Dec. 25, 2019

(86) PCT No.: PCT/JP2019/050959
§ 371 (c)(1),
(2) Date: Jul. 6, 2021

(87) PCT Pub. No.: WO2020/145160
PCT Pub. Date: Jul. 16, 2020

(65) Prior Publication Data

US 2022/0117248 A1 Apr. 21, 2022

(30) Foreign Application Priority Data

Jan. 7, 2019 (JP) ................................ 2019-000847
Feb. 4, 2019 (JP) ................................ 2019-018238
(Continued)

(51) Int. Cl.
*A23D 7/005* (2006.01)
*A23C 11/10* (2025.01)
(Continued)

(52) U.S. Cl.
CPC ............ *A23D 7/0053* (2013.01); *A23C 11/10* (2013.01); *A23D 7/04* (2013.01); *A23L 11/65* (2021.01)

(58) Field of Classification Search
CPC ......... A23D 7/0053; A23D 7/04; A23L 11/65; A23C 11/10
See application file for complete search history.

(56) References Cited

U.S. PATENT DOCUMENTS 2,526,302 A 10/1950 Turgasen
4,540,593 A 9/1985 Moran et al.
(Continued)

FOREIGN PATENT DOCUMENTS

EP 0106620 B1 3/1986
GB 117819 A 1/1919
(Continued)

OTHER PUBLICATIONS

"SPX—Crystallization Technology" Available online at https://www.spxflow.com/assets/original/gerstenberg-schroder-crystallization-technology-gb.pdf. (Year: 2012).*
(Continued)

*Primary Examiner* — Erik Kashnikow
*Assistant Examiner* — Assaf Zilbering
(74) *Attorney, Agent, or Firm* — Westman, Champlin & Koehler, P.A.

(57) ABSTRACT

The present invention provides a method for manufacturing a butter-like food derived from vegetable milk, the method including: separately heating a vegetable milk and a vegetable processed fat to a temperature equal to or higher than the melting point of the vegetable processed fat; adding the heated vegetable processed fat to the heated vegetable milk and performing emulsification; cooling a vegetable milk emulsion obtained by the emulsification; subjecting a creamy substance obtained by the cooling to churning or cavitation, and separating the creamy substance into an
(Continued)

aqueous phase and an oil phase; and kneading and homogenizing an oil phase solid obtained by removing the aqueous phase.

3 Claims, 1 Drawing Sheet

(30) Foreign Application Priority Data

| | | |
|---|---|---|
| Jun. 4, 2019 | (JP) | 2019-104541 |
| Sep. 19, 2019 | (JP) | 2019-170280 |
| Oct. 31, 2019 | (JP) | 2019-199035 |

(51) Int. Cl.

*A23D 7/04* (2006.01)
*A23L 11/65* (2025.01)

(56) References Cited

U.S. PATENT DOCUMENTS

| | | | | |
|---|---|---|---|---|
| 4,716,047 | A | 12/1987 | Biernoth et al. | |
| 10,863,722 | B2 | 12/2020 | Komatsubara | |
| 2014/0087025 | A1 | 3/2014 | Linsenmeier et al. | |
| 2016/0309764 | A1 | 10/2016 | Galaffu et al. | |
| 2016/0374370 | A1 | 12/2016 | Galaffu et al. | |
| 2017/0013855 | A1 * | 1/2017 | Tagi | A23L 11/45 |
| 2019/0069522 | A1 | 3/2019 | Komatsubara | |

FOREIGN PATENT DOCUMENTS

| | | | | |
|---|---|---|---|---|
| IT | TO20090811 | A1 | 4/2011 | |
| JP | S5925641 | A | 2/1984 | |
| JP | S59187736 | A | 10/1984 | |
| JP | S61170342 | A | 8/1986 | |
| JP | H02182149 | A | 7/1990 | |
| JP | 2005095085 | A | 4/2005 | |
| JP | 2010213637 | A | 9/2010 | |
| JP | 2015128410 | A | 7/2015 | |
| JP | 5780738 | B2 | 9/2015 | |
| JP | 2015527076 | A | 9/2015 | |
| JP | 5970029 | B2 | 8/2016 | |
| JP | 2016192958 | A | 11/2016 | |
| JP | 2017502660 | A | 1/2017 | |
| JP | 2017046661 | A | 3/2017 | |
| JP | 2017046663 | A | 3/2017 | |
| JP | 2017077219 | A * | 4/2017 | |
| JP | 2018088912 | A | 6/2018 | |
| JP | 6474876 | B2 | 2/2019 | |
| WO | 2008105352 | A1 | 9/2008 | |
| WO | 2011/077975 | A1 | 6/2011 | |
| WO | WO-2018173610 | A1 * | 9/2018 | A23C 20/025 |

OTHER PUBLICATIONS

International Search Report (including English translation) and Written Opinion for International Application No. PCT/JP2019/050959, dated Feb. 26, 2020, 11 pages.

Adinan Husin et al., "Processing of coconut milk (*santan*). I. Processing of santan into coconut butter", Malaysian Agricultural Journal, 1978, vol. 51, No. 3, p. 299-304.

Notice of Reasons for Rejection, for Japanese Patent Application No. 2019-104541, dated Jul. 30, 2019, 6 pages.

Notice of Reasons for Rejection, for Japanese Patent Application No. 2019-170280, dated Nov. 12, 2019, 5 pages.

Office Action, for Canadian Patent Application No. 3,126,356, dated May 10, 2022, 3 pages.

Extended European Search Report, for European Patent Application No. 19909045.7, dated Sep. 12, 2022, 8 pages.

Database GNPD [Online] Mintel, anonymous: "Soybean Margarine", XP055953673, Database accession No. 1433909, dated Nov. 8, 2010 (Nov. 8, 2010), 3 pages.

Radocaj, O., Dimic, E., & Vujasinovic, V. (2011). Optimization of the texture of fat-based spread containing hull-less pumpkin (*Cucurbita pepo* L.) seed press-cake. Acta Periodica Technologica, 42, 131-143. https://doi.org/10.2298/apt1142131r, 13 pages.

Indian Office Action for Indian Patent Application No. 202117034082, dated Jan. 27, 2026, 10 pages.

* cited by examiner

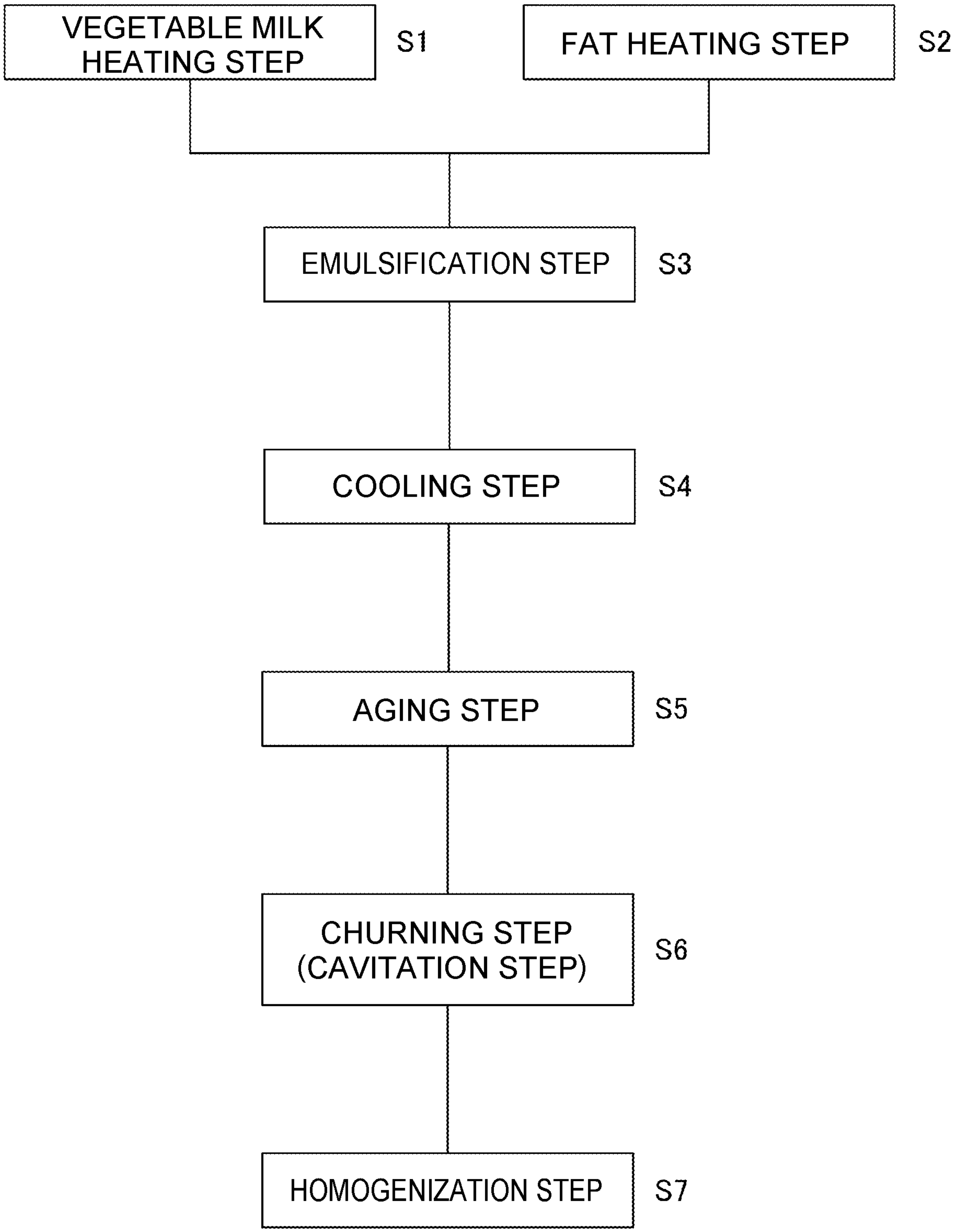
VEGETABLE MILK HEATING STEP
S1
FAT HEATING STEP
S2
EMULSIFICATION STEP
S3
COOLING STEP
S4
AGING STEP
S5
CHURNING STEP (CAVITATION STEP)
S6
HOMOGENIZATION STEP
S7

METHOD FOR MANUFACTURING BUTTER-LIKE FOOD DERIVED FROM VEGETABLE MILK AND BUTTER-LIKE FOOD DERIVED FROM VEGETABLE MILK

CROSS REFERENCE TO RELATED APPLICATION(S)

This application is a Section 371 National Stage Application of International Application No. PCT/JP2019/050959, filed on Dec. 25, 2019, entitled "METHOD FOR MANUFACTURING BUTTER-LIKE FOOD DERIVED FROM VEGETABLE MILK AND BUTTER-LIKE FOOD DERIVED FROM VEGETABLE MILK", which published as WO 2020/145160 A1, on Jul. 16, 2020, which claims priority to Japanese Patent Application No. 2019-000847, filed on Jan. 7, 2019, Japanese Patent Application No. 2019-018238, filed on Feb. 4, 2019, Japanese Patent Application No. 2019-104541, filed on Jun. 4, 2019, Japanese Patent Application No. 2019-170280, filed on Sep. 19, 2019, and Japanese Patent Application No. 2019-199035, filed on Oct. 31, 2019, the contents of which are incorporated herein by reference in their entireties.

TECHNICAL FIELD

The present application relates to a method for manufacturing a butter-like food derived from vegetable milk, and to a butter-like food derived from vegetable milk.

BACKGROUND ART

As disclosed in the following Japanese Patent Application Laid-Open (JP-A) No. 2005-95085, Japanese Patent (JP-B) No. 5970029 and WO2008/105352 A1, various methods for producing food materials derived from soy milk have been provided.

JP-A No. 2005-95085 discloses a technique for producing a gel derived from soy milk having physical properties resembling those of tofu (soy bean curd), by concentrating the soy milk, followed by a heat treatment.

Further, JP-B No. 5970029 discloses a technique for obtaining a soy milk cream having a cream-like texture, by adding an organic acid, a mineral acid or a divalent metal salt as a coagulant to soy milk to obtain an agglomerate containing a fat derived from soy milk, and subjecting the resultant to centrifugation.

In addition, WO 2008/105352 A1 discloses a technique in which a lipophilic emulsifier is used for reducing the occurrence of oil separation during the storage of a liquid composition containing soy protein, water and a fat and/or oil, after the production thereof.

Further, vegetable milks, which are milk-like liquids derived from nuts, grains or beans, such as soy milk, rice milk, coconut milk, almond milk or cashew nut milk, have been attracting attention, in recent years, not only as a food that can be used as a substitute for milk, for people who cannot consume dairy products for health reasons such as food allergies, or reasons based on religion, ideology or creed, but also as a food having real significance in terms of nutrition.

SUMMARY OF INVENTION

Technical Problem

An object of each embodiment of the present application is to produce a food whose appearance, impression from use, texture and taste are all butter-like, using a plant-derived material, specifically, a vegetable milk such as soy milk, rice milk, coconut milk, almond milk or cashew nut milk, as a raw material, without using any animal-derived material as a raw material.

Solution to Problem

A method for manufacturing a butter-like food derived from vegetable milk according to a first embodiment of the present application is characterized by including:

separately heating a vegetable milk and a vegetable processed fat to a temperature equal to or higher than the melting point of the vegetable processed fat;

adding the heated vegetable processed fat to the heated vegetable milk and performing emulsification;

cooling a vegetable milk emulsion obtained by the emulsification;

subjecting a creamy substance obtained by the cooling to churning or cavitation, and separating the creamy substance into an aqueous phase and an oil phase; and kneading and homogenizing an oil phase solid obtained by removing the aqueous phase.

The term "butter-like food" as used in the present application refers to a food which has plasticity resembling that of butter at normal temperature. The term "plasticity" as used herein refers to a physical property that, when a solid is deformed by the application of an external force, the deformation of the solid does not recover. In other words, in a state where a solid does not retain plasticity, the solid breaks without being deformed when an external force is applied thereto, or conversely, the entire solid flows, beyond the deformation applied. The "normal temperature" as used herein refers to a temperature range of from 20° C. to 30° C.

A second embodiment of the present application is characterized in that the vegetable milk is soy milk, rice milk, coconut milk, almond milk or cashew nut milk, in addition to the feature of the first embodiment.

A third embodiment of the present application is characterized by further adding a dietary fiber component to the oil phase solid, in addition to the feature of the second embodiment.

The dietary fiber component as used herein is desirably one selected depending on the type of the vegetable milk used. For example, it is possible to use, as the dietary fiber component: a powder of soybean curd refuse (hereinafter, also referred to as "okara powder") in the case of using soy milk as the vegetable milk; rice flour or brown rice bran in the case of using rice milk as the vegetable milk; coconut powder in the case of using coconut milk as the vegetable milk; almond powder in the case of using almond milk as the vegetable milk; and cashew nut powder in the case of using cashew nut milk as the vegetable milk. However, it is also possible to add a dietary fiber component which has no direct relationship with the type of the vegetable milk used, such as wheat bran flour.

A butter-like food derived from vegetable milk according to a fourth embodiment of the present application is characterized in that proteins, carbohydrates and ash contained in a vegetable milk that is a first raw material, fat globules of a vegetable processed fat that is a second raw material, and air bubbles are suspended in colloidal form, and that the butter-like food derived from vegetable milk retains plasticity at least at 20° C.

The definition of the term "plasticity" as used herein is the same as described above. In other words, the butter-like food derived from vegetable milk according to the present embodiment does not break due to being too rigid nor flow due to being too soft at least at 20° C., when an external force is applied thereto. It is noted that the plasticity described above is required to be retained at 20° C., but there is no problem when the plasticity is retained also at a temperature other than that.

A fifth embodiment of the present application is characterized in that, in addition to the features of the fourth embodiment:

- the vegetable milk is soy milk;
- the butter-like food derived from vegetable milk has a fat content of from 65% by mass to 85% by mass, a protein content of from 0.4% by mass to 2.5% by mass, a carbohydrate content of from 0.1% by mass to 3.5% by mass, and an ash content of from 0.1% by mass to 0.6% by mass;
- the fat has a melting point of from 25° C. to 45° C.; and
- the butter-like food derived from vegetable milk contains soy lecithin and isoflavone.

In the butter-like food derived from vegetable milk of the fifth embodiment described above, soy lecithin and isoflavone are contained due to using soy milk as a raw material.

A sixth embodiment of the present application is characterized in that the total proportion of soy lecithin and isoflavone with respect to the total amount of the butter-like food derived from vegetable milk is from 0.25% by mass to 0.5% by mass, in addition to the features of the fifth embodiment.

A seventh embodiment of the present application is characterized in that, in addition to the features of the fourth embodiment:

- the vegetable milk is rice milk;
- the butter-like food derived from vegetable milk has a fat content of from 65% by mass to 85% by mass, a protein content of 0.5% by mass or less, a carbohydrate content of from 2.5% by mass to 4.0% by mass, an ash content of from 0.05% by mass to 0.5% by mass, an α-tocopherol content of from 0.005% by mass to 0.02% by mass, a trans fatty acid content of 0.5% by mass or less, and a cholesterol content of 0.1% by mass or less; and
- the fat has a melting point of from 25° C. to 45° C.

An eighth embodiment of the present application is characterized in that, in addition to the features of the fourth embodiment:

- the vegetable milk is coconut milk;
- the butter-like food derived from vegetable milk has a fat content of from 60% by mass to 70% by mass, a protein content of from 0.1% by mass to 1.0% by mass, a carbohydrate content of from 0.1% by mass to 2.0% by mass, an ash content of from 0.05% by mass to 0.5% by mass, a lauric acid content of from 5% by mass to 15% by mass, an α-tocopherol content of from 0.005% by mass to 0.02% by mass, a trans fatty acid content of 0.5% by mass or less, and a cholesterol content of 0.1% by mass or less; and
- the fat has a melting point of from 25° C. to 45° C.

A ninth embodiment of the present application is characterized in that, in addition to the features of the fourth embodiment:

- the vegetable milk is almond milk;
- the butter-like food derived from vegetable milk has a fat content of from 70% by mass to 90% by mass or less, a protein content of from 0.1% by mass to 1.0% by mass, a carbohydrate content of 0.5% by mass or less, an ash content of from 0.05% by mass to 0.5% by mass, an α-tocopherol content of from 0.005% by mass to 0.02% by mass, a trans fatty acid content of 0.5% by mass or less, and a cholesterol content of 0.1% by mass or less; and
- the fat has a melting point of from 25° C. to 45° C.

A tenth embodiment of the present application is characterized in that, in addition to the features of the fourth embodiment:

- the vegetable milk is cashew nut milk;
- the butter-like food derived from vegetable milk has a fat content of from 70% by mass to 90% by mass, a protein content of from 0.1% by mass to 1.0% by mass, a carbohydrate content of 0.5% by mass or less, an ash content of from 0.05% by mass to 0.5% by mass, a zinc content in the ash of from 0.00005% by mass to 0.001% by mass, an α-tocopherol content of from 0.005% by mass to 0.02% by mass, a trans fatty acid content of 0.5% by mass or less, and a cholesterol content of 0.1% by mass or less; and
- the fat has a melting point of from 25° C. to 45° C.

An eleventh embodiment of the present application is characterized in that the fat has a melting point of from 30° C. to 35° C., in addition to the features of any one of fifth to tenth embodiments.

The fat contained in the butter-like food derived from vegetable milk according to each of the fifth to eleventh embodiments described above can be separated by a known method, for example, by heating, and collecting the separated supernatant. The melting point of the fat separated as the supernatant can be measured by a known method, for example, by the following method. In other words, one end of a capillary tube is dipped into a sample of the melted fat, to fill the capillary tube with the sample up to a height of about 10 mm. The thus filled capillary tube is left to stand for 24 hours in an environment of 10° C. or lower, or for 1 hour on ice, and the cooled capillary tube is attached closely to a lower portion of a thermometer with a rubber band or by an appropriate method, so that the positions of the respective lower ends of the capillary tube and the thermometer coincide with each other. The thermometer is then immersed in a beaker of an appropriate size (having a capacity of about 600 mL) filled with distilled water, so that the lower end of the thermometer is positioned at a depth 30 mm below the surface of water. While stirring the water in the beaker by an appropriate method, the beaker is heated at a rate of 2° C. per minute at first, and at a rate of 0.5° C. per minute after having reached a temperature 10° C. lower than the expected melting point, and the temperature at which the sample starts to rise in the capillary tube is determined as the melting point of the fat.

Since the vegetable milk as a raw material of the butter-like food derived from vegetable milk according to each of the fifth to eleventh embodiments described above, contains fat, although in a small amount, the fat contained the butter-like food derived from vegetable milk includes the fat derived from the vegetable milk. However, the proportion of the fat derived from the vegetable milk in the fat contained in the butter-like food derived from vegetable milk is small enough to be ignored, as compared to the proportion of the fat derived from the vegetable processed fat as a raw material. Therefore, when the melting point of the fat contained in the butter-like food derived from vegetable milk according to each of the fifth to eleventh embodiments is measured in the manner described above, the melting point thereof roughly coincides with the melting point of the vegetable processed fat as a raw material.

Advantageous Effects of Invention

Since each embodiment of the present application has the constitution as described above, it is possible to produce a food whose appearance, impression from use, texture and taste are all butter-like, using a plant-derived material, specifically, a vegetable milk such as soy milk, rice milk, coconut milk, almond milk or cashew nut milk, as a raw material, without using an animal-derived material as a raw material. This butter-like food is a purely vegetable food which is trans fatty acid- and cholesterol-free, different from ordinary butter derived from milk, and is a healthy food containing larger amounts of iron and copper, which are regarded as effective against anemia, as compared to ordinary butter.

BRIEF DESCRIPTION OF DRAWING

FIG. 1 is a flow chart showing the outline of a method for manufacturing a butter-like food derived from vegetable milk in an embodiment of the present application.

DESCRIPTION OF EMBODIMENTS

The embodiments of the present application will now be described with reference to the drawing.

FIG. 1 is a flow chart showing the outline of a method for manufacturing a butter-like food derived from vegetable milk in an embodiment of the present application.

In the method for manufacturing a butter-like food derived from vegetable milk according to the present embodiment, a creamy substance obtained by adding a vegetable processed fat to a vegetable milk to cause emulsification is subjected to churning or cavitation, and an oil phase solid obtained by removing the aqueous phase is kneaded and homogenized.

The vegetable milk may be, for example, soy milk, rice milk, coconut milk, almond milk or cashew nut milk, which is a milk-like liquid derived from nuts, grains or beans. However, soy milk or cashew nut milk is most suitable.

In order to allow, in a vegetable milk heating step S1, a vegetable processed fat which will be added later as an oil phase to be more easily emulsified with the vegetable milk (such as soy milk or cashew nut milk) which will constitute an aqueous phase to form an O/W type emulsion, the vegetable milk (such as soy milk or cashew nut milk) is heated to a temperature equal to or higher than the melting point of the vegetable processed fat, for example, to 60° C. If necessary, a hydrophilic emulsifier such as a sucrose fatty acid ester may be added to the vegetable milk (such as soy milk or cashew nut milk) in advance, in order to stabilize the emulsified state in an emulsification step S3 to be carried out later.

The "vegetable processed fat" as used herein refers to one obtained by adjusting the melting point of a plant-derived edible oil which is liquid at normal temperature, such as, for example, soybean oil, palm oil, rapeseed oil, cottonseed oil, rice bran oil, safflower oil, peanut oil, sesame oil, linseed oil, olive oil or corn oil, so as to be solid at normal temperature, by an appropriate means (such as hydrogenation or transesterification). The vegetable processed fat is most suitably soybean oil, palm oil or rapeseed oil whose melting point is adjusted to around 32° C.

Such a vegetable processed fat, for example, one having a melting point of about 32° C., is heated in a fat heating step S2, to a product temperature equal to or higher than the melting point of the fat, for example, to 60° C., and liquefied. If necessary, a lipophilic emulsifier such as a glycerin fatty acid ester, a sorbitan fatty acid ester or a propylene glycol fatty acid ester may be added to the vegetable processed fat in advance, in order to stabilize the emulsified state in the emulsification step S3 to be carried out later.

It is noted that the vegetable milk heating step S1 and the fat heating step S2 are carried out separately as individual steps.

The vegetable milk heated in the vegetable milk heating step S1 and the vegetable processed fat heated in the fat heating step S2 are subjected to an emulsification treatment in the emulsification step S3. Specifically, the heated vegetable milk is first introduced into an emulsification tank, and then the heated vegetable processed fat is introduced into the tank while stirring, little by little, such that air is not mixed thereinto. At this time, it is desired that the amount of the vegetable milk (such as soy milk or cashew nut milk) is adjusted, for example, within the range of from 20% by mass to 60% by mass, and preferably from 40% by mass to 60% by mass, with respect to the total amount of the resulting mixture, and the amount of vegetable processed fat (such as palm oil, soybean oil or rapeseed oil) to be introduced is adjusted, for example, within the range of from 40% by mass to 80% by mass, and preferably from 40% by mass to 60% by mass with respect to the total amount. By the emulsification step described above, an O/W type vegetable milk emulsion is formed. A pressure-type emulsification device, such as a colloid mill, a homomixer or a homogenizer may be used to achieve homogeneous emulsification, in order to stabilize the emulsified state of the O/W type emulsion. However, it is not preferred to enhance the emulsification or to refine the size of emulsified particles more than necessary, in order to facilitate breaking of the emulsification in the churning step or the cavitation step S6 to be carried out later.

When the resulting vegetable milk emulsion is cooled to a temperature of 15° C. or lower, preferably to 10° C. or lower, in a cooling step S4, a creamy substance having a cream-like appearance is obtained.

The creamy substance obtained in the cooling step is maintained in a cooled state as it is, for 8 or more hours, preferably 10 or more hours, in an aging step S5, and as a result, the fat in the cream is crystallized to be in a stable state.

In other words, fat crystals in the O/W cream can be adjusted to a moderate size, by gradually cooling the O/W cream and subjecting to the aging step. The O/W cream in which the fat crystals have been adjusted to a moderate size by cooling and aging, can be easily foamed in the subsequent churning (cavitation step), thereby improving the efficiency of the churning.

However, it is not preferred to refine the size of the fat crystals by rapid-cooling and scraping, as in the case of manufacturing margarine or the like. Therefore, an apparatus for rapid-cooling and plasticization (scraping heat exchanger, for example, PERFECTOR KONBINATOR; manufactured by WINCKLER & CO., LTD.) used in the production of margarine or the like is not necessary in the cooling step and the aging step.

Next, in the churning step or the cavitation step S6, the creamy substance is vigorously stirred in the tank so that air is mixed thereinto to form air bubbles in the creamy substance. By continuing the stirring, fat globules start to adsorb around the air bubbles formed by foaming of the cream. When the stirring is further continued, the air bubbles in the cream collapse, to cause the fat globules adsorbed on the surfaces of the air bubbles to aggregate with each other, and eventually, the cream separates into an aqueous phase and an oil phase.

The churning step or the cavitation step described above is intended to break the emulsification while foaming the cream, and a viscous paste-like substance obtained as the remaining oil phase solid, after removing the separated aqueous phase, is subjected to a homogenization step S7.

In order to form air bubbles in the creamy emulsified product, to break the emulsification while allowing fat globules to aggregate, and to efficiently collect the paste-like substance containing the oil phase and the remaining aqueous phase, the cavitation step using a cavitation apparatus having a stronger force to foam and to break the emulsification is more preferred, than the churning step using a churning apparatus used in the production of ordinary butter derived from milk.

It is noted here that in the production of so-called ordinary butter derived from milk, milk is first concentrated by centrifugation, reverse osmosis or the like, from a fat content of around 3% to about 40%, and then the resulting O/W type emulsified cream is further inverted to a W/O type emulsified butter by a churning apparatus. During this operation, a large amount of aqueous phase (whey, butter milk, skimmed milk, etc.) is produced and discarded, and an enormous amount of time is required for the separation and concentration.

In contrast, in the production of the butter-like food derived from vegetable milk in the present disclosure, an enormous time for separating the aqueous phase and concentrating milk having a low fat content (around 3%) to butter having a high fat content (around 80%) is not required, and a large amount of aqueous phase is not produced, either. In addition, by forcibly causing foaming to break the emulsification in the churning (cavitation) step, a state in which small air bubbles, aggregated fat globules, and proteins, carbohydrates and ash in the aqueous phase and the like, are suspended in a colloidal form, is formed, differing from the W/O type emulsion structure of butter. As a result, the resulting substance has plasticity under ordinary temperature conditions (for example, at 20° C.), and has a butter-like texture and flavor.

In the homogenization step S7, an excessive moisture is squeezed out from the paste-like substance, and the resultant is kneaded and homogenized in a kneader. In the resulting composition whose hardness has been increased and which has turned into a butter-like state by the above operation, a state in which small air bubbles, aggregated fat globules, and proteins, carbohydrates and ash in the aqueous phase and the like, are suspended in a colloidal form, is formed. This state is different from the W/O type emulsified structure of butter derived from milk. By forming such a colloidal state, a butter-like food derived from vegetable milk which has a butter-like appearance, impression from use, texture and taste can be obtained. After the homogenization step, the resulting butter-like food may be formed into a desired shape by molding or the like, and packaged, as appropriate. By using soy milk, rice milk, coconut milk, almond milk or cashew nut milk as the vegetable milk as a raw material, it is possible to obtain a butter-like food derived from each vegetable milk.

It is also possible to obtain a butter-like food derived from vegetable milk which has a fat-spread-like appearance and impression from use, by increasing the proportion of the vegetable milk higher than the range described above (for example, to a range of from about 60% by mass to 70% by mass). In this case, the breaking of the emulsification becomes more difficult due to a decreased oil phase content, and thus it is effective to carry out the cavitation step in which the breaking of the emulsification is performed strongly by a cavitation apparatus.

Further, it is possible to obtain a butter-like food derived from vegetable milk supplemented with a dietary fiber component and having reduced calories, by adding an appropriate amount (for example, from 5 parts by mass to 10 parts by mass, with respect to 100 parts by mass of the oil phase solid) of a dietary fiber component (such as okara powder, wheat bran flour or cashew nut powder) to the oil phase solid after carrying out the churning step or the cavitation step S6, and then subjecting the resulting mixture to the same homogenization step as described above. In a case in which soy milk is used as the vegetable milk as a raw material, it is desirable to use okara powder, which is also derived from soybeans as with the soy milk, as the dietary fiber component. Further, in a case in which cashew nut milk is used as the vegetable milk as a raw material, it is desirable to use cashew nut powder, which is also derived from cashew nut as with the cashew nut milk, as the dietary fiber component.

In a case in which 50% by mass or more but less than 60% by mass of soy milk as the vegetable milk, and from 40% by mass to 50% by mass of a soy processed fat, a palm oil processed fat or a rapeseed oil processed fat whose melting point is adjusted within the range of from 25° C. to 45° C., preferably from 30° C. to 35° C., as the vegetable processed fat, are used as raw materials, and subjected to the production method described above, the following butter-like food derived from vegetable milk can be obtained. Specifically, it is possible to obtain a butter-like food derived from soy milk which has a fat content of from 80% by mass to 85% by mass, a protein content of from 0.4% by mass to 2.5% by mass, a carbohydrate content of from 0.1% by mass to 3.5% by mass, and an ash content of from 0.1% by mass to 0.6% by mass; in which the fat has a melting point of from 25° C. to 45° C., preferably from 30° C. to 35° C.; and which contains soy lecithin and isoflavone. At this time, it is desirable that the total proportion of soy lecithin and isoflavone with respect to the total amount of the butter-like food derived from vegetable milk be from 0.25% by mass to 0.5% by mass. The butter-like food derived from soy milk in this case has a butter-like appearance, impression from use, texture and taste.

Further, in a case in which 60% by mass or more but less than 70% by mass of soy milk as the vegetable milk, and from 30% by mass to 40% by mass of a soy processed fat, a palm oil processed fat or a rapeseed oil processed fat whose melting point is adjusted within the range of from 25° C. to 45° C., preferably from 30° C. to 35° C., as the vegetable processed fat, are used as raw materials, and subjected to the production method described above, the following butter-like food derived from vegetable milk can be obtained. Specifically, it is possible to obtain a butter-like food derived from soy milk which has a fat content of from 65% by mass to 70% by mass, a protein content of from 0.4% by mass to 2.5% by mass, a carbohydrate content of from 0.1% by mass to 3.5% by mass, and an ash content of from 0.1% by mass to 0.6% by mass; in which the fat has a melting point of from 25° C. to 45° C., preferably from 30° C. to 35° C.; and which contains soy lecithin and isoflavone. At this time, it is desirable that the total proportion of soy lecithin and isoflavone with respect to the total amount of the butter-like food derived from vegetable milk be from 0.25% by mass to 0.5% by mass. The butter-like food derived from soy milk in this case has a fat-spread-like appearance, impression from use, texture and taste.

The "soy lecithin" as used herein refers to a phospholipid derived from soybeans, and "isoflavone" refers to a glycoside derived from soybean germ, both of which are soy-derived trace components. It can be confirmed that soy milk is definitely used as a raw material of the butter-like food derived from soy milk, when these soy-derived trace components are detected as the components thereof.

Based on the above, in a case in which 50% by mass or more but less than 70% by mass of soy milk as the vegetable milk, and from 30% by mass to 50% by mass of a soy processed fat, a palm oil processed fat or a rapeseed oil processed fat whose melting point is adjusted within the range of from 25° C. to 45° C., preferably from 30° C. to 35° C., as the vegetable processed fat, are used as raw materials, and subjected to the production method described above, the following butter-like food derived from vegetable milk can be obtained. Specifically, it is possible to obtain a butter-like food derived from soy milk which has a fat content of from 65% by mass to 85% by mass, a protein content of from 0.4% by mass to 2.5% by mass, a carbohydrate content of from 0.1% by mass to 3.5% by mass, and an ash content of from 0.1% by mass to 0.6% by mass; in which the fat has a melting point of from 25° C. to 45° C., preferably from 30° C. to 35° C.; and which contains soy lecithin and isoflavone. At this time, it is desirable that the total proportion of soy lecithin and isoflavone with respect to the total amount of the butter-like food derived from vegetable milk be from 0.25% by mass to 0.5% by mass. The butter-like food derived from soy milk in this case can be adjusted to have an arbitrary softness ranging from a butter-like softness to a fat-spread-like softness. It is noted that the melting point of the fat can be measured after separating the fat by the methods described above, and the melting point thereof roughly coincides with the melting point of the vegetable processed fat as a raw material.

In a case in which 40% by mass or more but less than 60% by mass of rice milk as the vegetable milk, and from 40% by mass to 60% by mass of a soy processed fat, a palm oil processed fat or a rapeseed oil processed fat whose melting point is adjusted within the range of from 25° C. to 45° C., preferably from 30° C. to 35° C., as the vegetable processed fat, are used as raw materials, and subjected to the production method described above, the following butter-like food derived from vegetable milk can be obtained. Specifically, it is possible to obtain a butter-like food derived from rice milk which has a fat content of from 65% by mass to 85% by mass, a protein content of 0.5% by mass or less, a carbohydrate content of from 2.5% by mass to 4.0% by mass, an ash content of from 0.05% by mass to 0.5% by mass, an α-tocopherol content of from 0.005% by mass to 0.02% by mass, a trans fatty acid content of 0.5% by mass or less, and a cholesterol content of 0.1% by mass or less; and in which the fat has a melting point of from 25° C. to 45° C.

In the butter-like food derived from rice milk described above, there is a significance in the fact that the trans fatty acid and cholesterol contents are equal to or lower than the upper limit values described above, as a difference from ordinary butter, and the values thereof may each be 0. There is also a significance in the fact that the protein content is equal to or lower than the upper limit value described above, as a difference from ordinary butter, and the value thereof may be 0. Further, due to using rice milk as a raw material, the carbohydrate content is higher than that of ordinary butter, and this point, as well, has a significance as a difference from ordinary butter. In addition, α-tocopherol is contained in a higher amount as compared to that of ordinary butter. This is derived from α-tocopherol (vitamin E) added as an antioxidant to the vegetable processed fat used as a raw material. It is noted that the melting point of the fat can be measured after separating the fat by the methods described above, and the melting point thereof roughly coincides with the melting point of the vegetable processed fat as a raw material.

In a case in which 40% by mass or more but less than 60% by mass of coconut milk as the vegetable milk, and from 40% by mass to 60% by mass of a soy processed fat, a palm oil processed fat or a rapeseed oil processed fat whose melting point is adjusted within the range of from 25° C. to 45° C., preferably from 30° C. to 35° C., as the vegetable processed fat, are used as raw materials, and subjected to the production method described above, the following butter-like food derived from vegetable milk can be obtained. Specifically, it is possible to obtain a butter-like food derived from coconut milk which has a fat content of from 60% by mass to 70% by mass, a protein content of from 0.1% by mass to 1.0% by mass, a carbohydrate content of from 0.1% by mass to 2.0% by mass, an ash content of from 0.05% by mass to 0.5% by mass, a lauric acid content of from 5% by mass to 15% by mass, an α-tocopherol content of from 0.005% by mass to 0.02% by mass, a trans fatty acid content of 0.5% by mass or less, and a cholesterol content of 0.1% by mass or less; and in which the fat has a melting point of from 25° C. to 45° C.

In the butter-like food derived from coconut milk described above, there is a significance in the fact that the trans fatty acid and cholesterol contents are equal to or lower than the upper limit values described above, as a difference from ordinary butter, and the values thereof may each be 0. Further, due to using coconut milk as a raw material, the lauric acid content is higher than that of ordinary butter, and this point, as well, has a significance as a difference from ordinary butter. In addition, α-tocopherol is contained in a higher amount as compared to that of ordinary butter. This is derived from α-tocopherol (vitamin E) added as an antioxidant to the vegetable processed fat used as a raw material. It is noted that the melting point of the fat can be measured after separating the fat by the methods described above, and the melting point thereof roughly coincides with the melting point of the vegetable processed fat as a raw material.

In a case in which 40% by mass or more but less than 60% by mass of almond milk as the vegetable milk, and from 40% by mass to 60% by mass of a soy processed fat, a palm oil processed fat or a rapeseed oil processed fat whose melting point is adjusted within the range of from 25° C. to 45° C., preferably from 30° C. to 35° C., as the vegetable processed fat, are used as raw materials, and subjected to the production method described above, the following butter-like food derived from vegetable milk can be obtained. Specifically, it is possible to obtain an butter-like food derived from almond milk which has a fat content of from 70% by mass to 90% by mass or less, a protein content of from 0.1% by mass to 1.0% by mass, a carbohydrate content of 0.5% by mass or less, an ash content of from 0.05% by mass to 0.5% by mass, an α-tocopherol content of from 0.005% by mass to 0.02% by mass, a trans fatty acid content of 0.5% by mass or less, and a cholesterol content of 0.1% by mass or less; and in which the fat has a melting point of from 25° C. to 45° C.

In the butter-like food derived from almond milk described above, there is a significance in the fact that the trans fatty acid and cholesterol contents are equal to or lower than the upper limit values described above, as a difference from ordinary butter, and the values thereof may each be 0.

Further, due to using an almond milk whose carbohydrate content is relatively low for a vegetable milk, as a raw material, the carbohydrate content is within the range whose upper limit value is the value described above, and the value thereof may be 0. In addition, α-tocopherol is contained in a higher amount as compared to that of ordinary butter. This is derived from α-tocopherol (vitamin E) added as an antioxidant to the vegetable processed fat used as a raw material. It is noted that the melting point of the fat can be measured after separating the fat by the methods described above, and the melting point thereof roughly coincides with the melting point of the vegetable processed fat as a raw material.

In a case in which 40% by mass or more but less than 60% by mass of cashew nut milk as the vegetable milk, and from 40% by mass to 60% by mass of a soy processed fat, a palm oil processed fat or a rapeseed oil processed fat whose melting point is adjusted within the range of from 25° C. to 45° C., preferably from 30° C. to 35° C., as the vegetable processed fat, are used as raw materials, and subjected to the production method described above, the following butter-like food derived from vegetable milk can be obtained. Specifically, it is possible to obtain a butter-like food derived from cashew nut milk which has a fat content of from 70% by mass to 90% by mass, a protein content of from 0.1% by mass to 1.0% by mass, a carbohydrate content of 0.5% by mass or less, an ash content of from 0.05% by mass to 0.5% by mass, a zinc content in the ash of from 0.00005% by mass to 0.001% by mass, an α-tocopherol content of from 0.005% by mass to 0.02% by mass, a trans fatty acid content of 0.5% by mass or less, and a cholesterol content of 0.1% by mass or less; and in which the fat has a melting point of from 25° C. to 45° C.

In the butter-like food derived from cashew nut milk described above, there is a significance in the fact that the trans fatty acid and cholesterol contents are equal to or lower than the upper limit values described above, as a difference from ordinary butter, and the values thereof may each be 0. Further, due to using cashew nut milk having a low carbohydrate content as a raw material, the carbohydrate content is within the range whose upper limit value is the value described above, and the value thereof may be 0. Sill further, due to using cashew nut milk having a high zinc content as a raw material, the value of the zinc content is as described above. In addition, α-tocopherol is contained in a higher amount as compared to that of ordinary butter. This is derived from α-tocopherol (vitamin E) added as an antioxidant to the vegetable processed fat used as a raw material. It is noted that the melting point of the fat can be measured after separating the fat by the methods described above, and the melting point thereof roughly coincides with the melting point of the vegetable processed fat as a raw material.

EXAMPLES

(1) Example 1: Butter-like Food Derived from Soy Milk

As raw materials, 5 kg (50% by mass) of unhomogenized soy milk and 5 kg (50% by mass) of a palm oil processed fat having a melting point of 33° C. were used.

First, the unhomogenized soy milk was heated to a product temperature of 60° C. (vegetable milk heating step S1). Separately, the palm oil processed fat was heated and melted at 60° C. (fat heating step S2). Thereafter, the palm oil processed fat which had been heated and melted was added to the heated unhomogenized soy milk while stirring, and pre-emulsified into an O/W type emulsion (emulsification step S3).

Subsequently, the thus prepared pre-emulsified product was passed through a colloid mill to perform homogenization, then cooled to a product temperature of 15° C. while softly stirring (cooling step S4), and left to stand as it is in a cool place for 15 hours to perform aging (aging step S5).

Next, the emulsified product after aging was transferred to a vertical mixer for confectionery and bread making (30 quarts, manufactured by AICOHSHA MFG. CO., LTD.) equipped with a whipper, and stirred at the highest speed to cause the occurrence of cavitation to break the emulsification, thereby separated into an aqueous phase and an oil phase solid (cavitation step, S6).

Thereafter, the oil phase solid from which the aqueous phase had been separated and removed with a filter cloth was introduced again into the vertical mixer to which a beater had been attached this time, kneaded homogeneously (homogenization step, S7), and then transferred to an appropriate container, to obtain a butter-like food derived from soy milk. The resulting butter-like food derived from soy milk was a colloidal composition in which air bubble particles, aqueous phase, proteins, carbohydrates and the like were dispersed in the oil phase, not a W/O type emulsion.

The butter-like food derived from soy milk obtained as described above was subjected to a component analysis. The results were as shown in the following Table 1.

TABLE 1

| Component | Content (% by mass) |
|---|---|
| Moisture | 14.3 |
| Proteins | 0.8 |
| Fat | 83.6 |
| (Soy lecithin) | (0.262) |
| Carbohydrates | 1.2 |
| (Isoflavone) | (0.008) |
| Ash | 0.1 |

It is noted that soy lecithin is included in the fat, because soy lecithin is a phospholipid. Further, since isoflavone exists as a glycoside, isoflavone is included in the carbohydrates. Therefore, in the Table 1 above, soy lecithin and isoflavone are shown in parentheses below the fat and the carbohydrates, respectively.

As shown in the Table 1, the proportion of soy-derived trace components was 0.270% by mass, which is the total sum of 0.262% by mass of the soy lecithin content and 0.008% by mass of the isoflavone content. Since such soy-derived trace components are detected, it has been confirmed that the resulting butter-like food is derived from soy milk. When the fat of the butter-like food derived from soy milk was separated and the melting point thereof was measured, in accordance with the methods described above, the measured melting point roughly coincided with the melting point of the palm oil processed fat as a raw material.

(2) Example 2: Butter-like Food Derived from Soy Milk

In Example 2, the same operation as in the Example 1 described above was carried out up to the cavitation step (S6). Thereafter, 5 parts by mass of okara powder (LGI powder, 500 mesh, OKM) was added to 100 parts by mass of the oil phase solid from which the aqueous phase had been separated and removed with a filter cloth. Then the resultant was kneaded homogeneously (homogenization step, S7) in the vertical mixer equipped with a beater, and transferred to an appropriate container, to obtain a butter-like food derived from soy milk. The resulting butter-like food derived from soy milk was a colloidal composition in which air bubble particles, aqueous phase, proteins, carbohydrates and the like were dispersed in the oil phase, not a W/O type emulsion.

The butter-like food derived from soy milk obtained as described above was subjected to a component analysis. The results were as shown in the following Table 2.

TABLE 2

| Component | Content (% by mass) |
|---|---|
| Moisture | 14.3 |
| Proteins | 2.1 |
| Fat | 80.2 |
| (Soy lecithin) | (0.311) |
| Carbohydrates | 3.1 |
| (Isoflavone) | (0.011) |
| Ash | 0.3 |

The numerical values of soy lecithin and isoflavone are shown in parentheses, because of the same reasons as described in the Example 1.

As shown in the Table 2 above, the proportion of soy-derived trace components was 0.322% by mass, which is the total sum of 0.311% by mass of the soy lecithin content and 0.011% by mass of the isoflavone content. Since such soy-derived trace components are detected, it has been confirmed that the resulting butter-like food is derived from soy milk. When the fat of the butter-like food derived from soy milk was separated and the melting point thereof was measured, in accordance with the methods described above, the measured melting point roughly coincided with the melting point of the palm oil processed fat as a raw material.

(3) Example 3: Butter-Like Food Derived from Soy Milk

A butter-like food derived from soy milk can also be obtained as follows.

As raw materials, 2 kg (20% by mass) of unhomogenized soy milk and 8 kg (80% by mass) of a mixed fat having the following composition are used.

Rapeseed oil processed fat (melting point: 36° C.) obtained by transesterification: 80% by mass.

Refined soy oil: 20% by mass

The calculated melting point of the mixed fat is 33.8° C. The calculated melting point is calculated by assuming the melting point of the refined soy oil to be 25° C., and by proportionally dividing the respective melting points by the blending ratio of the raw materials, as shown in the following calculation formula.

$$36(° C.)\times 0.8+25(° C.)\times 0.2=33.8(° C.)$$

First, the unhomogenized soy milk is heated to a product temperature of 60° C. (vegetable milk heating step S1). Separately, the mixed fat is heated and melted at 60° C. (fat heating step S2). Thereafter, the heated unhomogenized soy milk and the heated and melted mixed fat are emulsified with a TK HOMOMIXER (manufactured by Tokusyu Kika Kogyo Co., Ltd.) to prepare an O/W type emulsion (emulsification step S3).

Subsequently, the resulting emulsified product is stored for 18 hours in a cool place at a temperature of from 10° C. to 15° C., to perform cooling and aging (cooling step S4 and aging step S5).

Next, the emulsified product after aging is stirred at a high speed with the TK homomixer in a state where a commutation plate is raised to the vicinity of the interface, to cause the occurrence of cavitation to break the emulsification, thereby separated into an aqueous phase and an oil phase solid (cavitation step, S6).

Thereafter, the oil phase solid from which the aqueous phase is separated and removed with a filter cloth is kneaded homogeneously (homogenization step, S7) in a bread dough kneading machine (manufactured by Japan Kneader Co., Ltd.), and then transferred to an appropriate container, to obtain a butter-like food derived from soy milk. The resulting butter-like food derived from soy milk will be a colloidal composition in which air bubble particles, aqueous phase, proteins, carbohydrates and the like are dispersed in the oil phase, not a W/O type emulsion. When the fat of the butter-like food derived from soy milk was separated and the melting point thereof was measured, in accordance with the methods described above, the measured melting point roughly coincided with the melting point of the mixed fat as a raw material.

Before subjecting the oil phase solid to the homogenization step, from 5 parts by mass to 10 parts by mass of okara powder may be added to 100 parts by mass of the oil phase solid, in the same manner as in the Example 2.

(4) Example 4: Butter-Like Food Derived from Rice Milk

As raw materials, 4 kg (40% by mass) of RICE MILK (manufactured by Kikkoman Corporation) and 6 kg (60% by mass) of a palm oil processed fat having a melting point of 33° C. were used.

First, the rice milk was heated to a product temperature of 55° C. (vegetable milk heating step S1). Separately, the palm oil processed fat was heated and melted at 60° C. (fat heating step S2). Thereafter, the heated palm oil processed fat was added to the heated rice milk while stirring with a TK HOMOMIXER, and pre-emulsified into an O/W type emulsion (emulsification step S3).

Subsequently, the thus prepared pre-emulsified product was passed through a colloid mill to perform homogenization, then cooled to a product temperature of 10° C. while softly stirring (cooling step S4), and left to stand as it is in a cool place for 15 hours to perform aging (aging step S5).

Next, the emulsified product after aging was transferred to a vertical mixer for confectionery and bread making (30 quarts, manufactured by AICOHSHA MFG. CO., LTD.), and stirred with a whipper at the highest speed so as to allow foaming to continue for a period from 7 to 8 minutes, to break the emulsification, thereby separated into an aqueous phase and an oil phase solid (cavitation step, S6).

Thereafter, the oil phase solid from which the aqueous phase had been separated and removed with a filter cloth was introduced again into the vertical mixer to which a beater had been attached this time, kneaded homogeneously (homogenization step, S7), and then transferred to an appropriate container, to obtain a butter-like food derived from rice milk. The resulting butter-like food derived from rice milk was a colloidal composition in which air bubble particles, aqueous phase, proteins, carbohydrates and the like were dispersed in the oil phase, not a W/O type emulsion.

The butter-like food derived from rice milk obtained as described above was subjected to a component analysis. The results were as shown in the following Table 3. The descriptions "-" in the following Table 3 indicate that the contents of the corresponding components were each less than the detection limit. Further, the total of the following numerical values is not 100% due to reasons related to significant figures. It is noted, however, that trans fatty acids are components contained in the fat.

TABLE 3

| Component | Content (% by mass) |
|---|---|
| Moisture | 13.2 |
| Proteins | — |
| Fat | 83.5 |
| Carbohydrates | 3.2 |
| Ash | 0.1 |
| α-tocopherol | 0.0103 |
| Trans fatty acids | 0.35 |
| Cholesterol | — |

As shown in the Table 3 above, the trans fatty acid content is 0.35% by mass. This is significantly lower than the average value of the trans fatty acid content in ordinary butter, which is 1.951 g/100 g (namely, 1.951% by mass) according to the ""Research Report on Evaluation Basic Data of Trans Fatty Acids in Food" (2007)" by The Food Safety Commission". Further, the cholesterol content in ordinary butter is 210 mg/100 g (namely, 0.21% by mass) according to the Standard Tables of Food Composition in Japan, 2015 (Seventh Revision) (hereinafter, referred to as "food composition tables"). In contrast, the cholesterol content in the Table 3 was less than the detection limit. The α-tocopherol content in ordinary butter is 1.5 mg/100 g (namely, 0.0015% by mass) according to the food composition tables, whereas the value of the α-tocopherol content in the Table 3 was about 10 times the value thereof. The protein content in ordinary butter is 0.6 g/100 g (namely, 0.6% by mass) according to the food composition tables, whereas the protein content in the Table 3 was less than the detection limit. As described above, the butter-like food derived from rice milk can be well distinguished from ordinary butter based on the analyzed values. On the other hand, the carbohydrate content in ordinary butter is 0.2 g/100 g (namely, 0.2% by mass) according to the food composition tables, whereas the carbohydrate content in the Table 3 is 3.2% by mass, which is 10 times or more the above value. This is considered as one of the features of the butter-like food derived from rice milk, resulting from the use of rice milk as a raw material. When the fat of the butter-like food derived from rice milk was separated and the melting point thereof was measured, in accordance with the methods described above, the measured melting point roughly coincided with the melting point of the palm oil processed fat as a raw material.

(5) Example 5: Butter-Like Food Derived from Coconut Milk

A butter-like food derived from coconut milk was obtained by the production method according to the Example 3, except that 4 kg (40% by mass) of coconut milk and 6 kg (60% by mass) of a palm oil processed fat having a melting point of 33° C. were used as raw materials. The resulting butter-like food derived from coconut milk was a colloidal composition in which air bubble particles, aqueous phase, proteins, carbohydrates and the like were dispersed in the oil phase, not a W/O type emulsion.

The butter-like food derived from coconut milk obtained as described above was subjected to a component analysis. The results were as shown in the following Table 4. The description "-" in the following Table 4 indicates that the content of the corresponding component was less than the detection limit. Further, the total of the following numerical values is not 100% due to reasons related to significant figures. It is noted, however, that trans fatty acids and lauric acid are components contained in the fat.

TABLE 4

| Component | Content (% by mass) |
|---|---|
| Moisture | 31.2 |
| Proteins | 0.4 |
| Fat | 67.6 |
| Carbohydrates | 0.7 |
| Ash | 0.1 |
| Lauric acid | 9.5 |
| α-tocopherol | 0.0057 |
| Trans fatty acids | 0.24 |
| Cholesterol | — |

As shown in the Table 4 above, the trans fatty acid content is 0.24% by mass, which is significantly lower than the average value in the butter described above. Further, while the cholesterol content is less than the detection limit, and is significantly lower than the value in the butter described above, the α-tocopherol content is 0.0057% by mass, which is significantly higher. Therefore, the butter-like food derived from coconut milk can be well distinguished from ordinary butter based on the analyzed values. On the other hand, the lauric acid content is 9.5% by mass, and is about 4 times and significantly higher than the content of lauric acid (12:0 fatty acid) in salted butter according to "National Nutrient Database" of the United States Department of Agriculture (USDA), which is 2.587 g/100 g (namely, 2.587% by mass). This was considered as a feature of the butter-like food derived from coconut milk. When the fat of the butter-like food derived from coconut milk was separated and the melting point thereof was measured, in accordance with the methods described above, the measured melting point roughly coincided with the melting point of the palm oil processed fat as a raw material.

(6) Example 6: Butter-Like Food Derived from Almond Milk

An butter-like food derived from almond milk was obtained by the production method according to the Example 3, except that 4 kg (40% by mass) of almond milk and 6 kg (60% by mass) of a palm oil processed fat having a melting point of 33° C. were used as raw materials. The resulting butter-like food derived from almond milk was a colloidal composition in which air bubble particles, aqueous phase, proteins, carbohydrates and the like were dispersed in the oil phase, not a W/O type emulsion.

The butter-like food derived from almond milk obtained as described above was subjected to a component analysis. The results were as shown in the following Table 5. The descriptions "-" in the following Table 5 indicate that the contents of the corresponding components were each less than the detection limit. Further, the total of the following numerical values is not 100% due to reasons related to significant figures. It is noted, however, that trans fatty acids are components contained in the fat.

TABLE 5

| Component | Content (% by mass) |
|---|---|
| Moisture | 11.1 |
| Proteins | 0.3 |
| Fat | 88.6 |
| Carbohydrates | — |
| Ash | 0.3 |
| α-tocopherol | 0.0105 |
| Trans fatty acids | 0.38 |
| Cholesterol | — |

As shown in the Table 5 above, the trans fatty acid content is 0.38% by mass, which is significantly lower than the standard value in the butter described above. Further, while the cholesterol content is less than the detection limit, and is significantly lower than the value in the butter described above, the α-tocopherol content is 0.0105% by mass, which is significantly higher. Therefore, the butter-like food derived from almond milk can be well distinguished from ordinary butter based on the analyzed values. The carbohydrate content is less than the detection limit, and is significantly lower than the carbohydrate content in butter according to the food composition tables, which is 0.2 g. This is considered as one of the features of the butter-like food derived from almond milk in which almond milk having a low carbohydrate content is used as a raw material. When the fat of the butter-like food derived from almond milk was separated and the melting point thereof was measured, in accordance with the methods described above, the measured melting point roughly coincided with the melting point of the palm oil processed fat as a raw material.

(7) Example 7: Butter-Like Food Derived from Cashew Nut Milk

A butter-like food derived from cashew nut milk was obtained by the production method according to the Example 3, except that 4 kg (40% by mass) of cashew nut milk and 6 kg (60% by mass) of a palm oil processed fat having a melting point of 33° C. were used as raw materials. The resulting butter-like food derived from cashew nut milk was a colloidal composition in which air bubble particles, aqueous phase, proteins, carbohydrates and the like were dispersed in the oil phase, not a W/O type emulsion.

The butter-like food derived from cashew nut milk obtained as described above was subjected to a component analysis. The results were as shown in the following Table 6. Further, the total of the following numerical values is not 100% due to reasons related to significant figures. It is noted, however, that trans fatty acids are components contained in the fat.

TABLE 6

| Component | Content (% by mass) |
|---|---|
| Moisture | 14.5 |
| Proteins | 0.4 |
| Fat | 84.6 |
| Carbohydrates | 0.5 |
| Ash | 0.1 |
| Zinc | 0.00009 |
| α-tocopherol | 0.0107 |
| Trans fatty acids | 0.47 |
| Cholesterol | 0.001 |

The average value of the trans fatty acid content in ordinary butter is 1.951 g/100 g (namely, 1.951% by mass) according to ""Research Report on Evaluation Basic Data of Trans Fatty Acids in Food" (2007) by The Food Safety Commission". In contrast, as shown in the Table 6 above, the trans fatty acid content of the butter-like food derived from cashew nut milk is 0.47% by mass, which is significantly lower than the above value. Further, the cholesterol content in ordinary butter is 210 mg/100 g (namely, 0.21% by mass) according to the Standard tables of food composition in Japan, 2015 (Seventh Revision) (hereinafter, referred to as "food composition tables"). In contrast, the cholesterol content of the butter-like food derived from cashew nut milk was 0.001% by mass, as shown in the Table 6 above, which was significantly lower than the above value. On the other hand, the α-tocopherol content in ordinary butter is 1.5 mg/100 g (namely, 0.0015% by mass) according to the food composition tables, whereas the α-tocopherol content in the butter-like food derived from cashew nut milk was 0.0105% by mass, which was significantly higher than the above value. Based on the above, the butter-like food derived from cashew nut milk can be well distinguished from ordinary butter based on the analyzed values. Further, the carbohydrate content is 0.5% by mass, and is significantly lower than the carbohydrate content in butter according to the food composition tables, which is 0.2 g. This is one of the features of the butter-like food derived from cashew nut milk in which cashew nut milk having a low carbohydrate content is used as a raw material. The fact that zinc is contained, although in a trace amount, is also a feature of the butter-like food derived from cashew nut milk in which cashew nut milk having a high zinc content is used as a raw material. When the fat of the butter-like food derived from cashew nut milk was separated and the melting point thereof was measured, in accordance with the methods described above, the measured melting point roughly coincided with the melting point of the palm oil processed fat as a raw material.

(8) Evaluation of Plasticity

The plasticity of the butter-like food derived from soy milk of Example 1, the butter-like food derived from rice milk of Example 4, the butter-like food derived from coconut milk of Example 5, the butter-like food derived from almond milk of Example 6, and the butter-like food derived from cashew nut milk of Example 7, which have been described above, were evaluated as follows. Ordinary butter was used as Comparative Example.

Specifically, samples of Examples and Comparative Example were each cut into a cube of about 3 cm, and stored at 5° C., 10° C., 15° C. or 20° C. for 12 hours.

Using a RHEOMETER (RTC2005D-D, manufactured by Rheotech Co., Ltd.), a stress required for deformation of each sample was measured. Specifically, a plunger whose tip is provided with a disk having a diameter of 5 mm was penetrated into each sample to a depth of 15 mm, from the state in which the plunger and the sample were brought into contact, at a penetration speed of 2 cm/min, and the maximum stress ($N/cm^2$) at this point was measured by the rheometer. The results thereof are shown in the following Table 7 and Table 8.

TABLE 7

| Temperature (° C.) | Maximum Stress (N/cm²) Example 1 (Soy milk) | Example 4 (Rice milk) | Example 5 (Coconut milk) | Example 6 (Almond milk) | Comparative Example (Butter) |
|---|---|---|---|---|---|
| 5 | 38.0 | 42.0 | 13.4 | 12.9 | 55.0 |
| 10 | 29.0 | 32.0 | 8.6 | 8.6 | 51.0 |
| 15 | 19.0 | 9.4 | 1.0 | 2.4 | 23.5 |
| 20 | 10.4 | 4.1 | 0.4 | 1.1 | 12.4 |

TABLE 8

| Temperature (° C.) | Maximum Stress (N/cm²) Example 7 (Cashew nut milk) | Comparative Example (Butter) |
|---|---|---|
| 5 | 42.2 | 55.0 |
| 10 | 34.0 | 51.0 |
| 15 | 5.8 | 23.5 |
| 20 | 4.7 | 12.4 |

As can be seen from the Table 7 and Table 8 above, a decrease in the maximum stress associated with an increase in the temperature was observed in all the samples. Further, in all the Examples, it has been confirmed that the maximum stress is lower and the deformation due to stress occurs more easily as compared to Comparative Example, at any of the temperatures. In particular, in the butter-like food derived from coconut milk of Example 5 and the butter-like food derived from almond milk of Example 6, it has been confirmed that the maximum stress is lower and the deformation due to stress occurs more easily as compared to Example 1 and Example 4 as well as Comparative Example, at any of the temperatures.

However, the samples cracked during the measurements at 5° C., 10° C. and 15° C. in all of the Examples and Comparative Example, and accordingly, it is considered that the samples do not have plasticity at these temperatures. In contrast, the deformation caused by the plunger was maintained in all of the Examples and Comparative Example at 20° C., confirming that the samples have plasticity. In particular, it has been confirmed that each of the butter-like food derived from soy milk of Example 1, the butter-like food derived from rice milk of Example 4 and the butter-like food derived from cashew nut milk of Example 7, shows roughly the same behavior as the butter of Comparative Example, regarding the plasticity.

INDUSTRIAL APPLICABILITY

The present invention can be used in the production of a butter-like food derived from vegetable milk, particularly, a butter-like food derived from soy milk and a butter-like food derived from cashew nut milk.

The invention claimed is:

1. A method for manufacturing a butter-like food derived from vegetable milk, the method comprising:
- separately heating a vegetable milk and a vegetable processed fat to a temperature equal to or higher than a melting point of the vegetable processed fat;
- adding the heated vegetable processed fat to the heated vegetable milk and performing emulsification;
- cooling a vegetable milk emulsion obtained by the emulsification;
- subjecting a creamy substance obtained by the cooling to churning or cavitation, and separating the creamy substance into an aqueous phase and an oil phase; and
- kneading and homogenizing an oil phase solid obtained by removing the aqueous phase to thereby produce the butter-like food derived from vegetable milk.

2. The method for manufacturing a butter-like food derived from vegetable milk according to claim 1, wherein the vegetable milk is soy milk, rice milk, coconut milk, almond milk or cashew nut milk.

3. The method for manufacturing a butter-like food derived from vegetable milk according to claim 2, the method further comprising adding a dietary fiber component to the oil phase solid.

* * * * *